(12) United States Patent
Miller

(10) Patent No.: US 9,266,462 B2
(45) Date of Patent: Feb. 23, 2016

(54) BUCKLE ASSEMBLY FOR TIE DOWN STRAP

(76) Inventor: Robert W. Miller, Huntington Beach, CA (US)

( * ) Notice: Subject to any disclaimer, the term of this patent is extended or adjusted under 35 U.S.C. 154(b) by 0 days.

(21) Appl. No.: 13/452,779

(22) Filed: Apr. 20, 2012

(65) Prior Publication Data

US 2013/0104354 A1    May 2, 2013

Related U.S. Application Data

(63) Continuation-in-part of application No. 12/930,959, filed on Jan. 20, 2011, now abandoned, which is a continuation-in-part of application No. 12/802,845, filed on Jun. 15, 2010, now abandoned.

(60) Provisional application No. 61/338,993, filed on Mar. 1, 2010.

(51) Int. Cl.
*A44B 11/06* (2006.01)
*B60P 7/08* (2006.01)

(52) U.S. Cl.
CPC .............. *B60P 7/0823* (2013.01); *A44B 11/065* (2013.01); *B60P 7/083* (2013.01); *Y10T 24/2175* (2015.01)

(58) Field of Classification Search
CPC ..... B60P 7/0823; B60P 7/083; A44B 11/065; Y10T 24/2175
USPC ..... 24/170, 193, 69 ST, 69 CT, 68 CD, 68 A, 24/68 E, 70 ST, 69 SB, 71 ST, 265 EC, 24/265 H, 302, 191, 265 CD; 410/100
See application file for complete search history.

(56) References Cited

U.S. PATENT DOCUMENTS

| | | | | |
|---|---|---|---|---|
| 2,998,626 A | * | 9/1961 | Prete, Jr. | 24/170 |
| 3,099,055 A | * | 7/1963 | Huber | 410/103 |
| 4,136,427 A | * | 1/1979 | Shum | 29/890.045 |
| 4,790,713 A | | 12/1988 | Miller | |
| 4,932,829 A | | 6/1990 | Miller | |
| 5,661,877 A | * | 9/1997 | Bloomer | 24/170 |
| 6,547,218 B2 | | 4/2003 | Landy | |
| 6,665,913 B2 | * | 12/2003 | Kosh et al. | 24/193 |
| 7,416,167 B1 | | 8/2008 | Knox | |
| 2005/0111945 A1 | | 5/2005 | Miller | |
| 2009/0263220 A1 | | 10/2009 | Miller | |

* cited by examiner

*Primary Examiner* — Abigail Morrell
(74) *Attorney, Agent, or Firm* — Stetina Brunda Garred & Brucker

(57) ABSTRACT

A cam buckle frame includes a first roller aligned transversally across the frame proximate the free end of an operating lever of a web toothed locking cam. The roller directs the web in contact with the operating lever of the locking cam to provide a self-locking feature without requirement for a torsion spring. Other transverse posts and rollers may be included in the web clamp frame and the corresponding hook end of the tie-down to form a secured pulley arrangement to provide a multiplication of applied tension force. One end of the frame side-wall adjacent said first roller may form an integral hook assembly with a structural latch. An option is to have the frame closed out by connecting opposing walls with a section that provides a center port to allow attachment of various style hooks. A pivoting hook-end used to connect to soft hook loops is described.

11 Claims, 7 Drawing Sheets

BUCKLE ASSEMBLY FOR TIE DOWN STRAP

CROSS-REFERENCE TO RELATED APPLICATIONS

This application is a continuation-in-part of U.S. patent application Ser. No. 12/930,959 filed Jan. 20, 2011 which is, in turn, a continuation-in-part of Ser. No. 12/802,845 filed on Jun. 15, 2010 which, in turn, obtains the benefit of the earlier filing date of U.S. Provisional Application Ser. No. 61/338,993 filed on Mar. 1, 2010 and the benefit of these earlier filing dates is claimed for all matter common therewith.

BACKGROUND OF THE INVENTION

1. Field of the Invention

The present invention relates to improvements in web cam buckles such as are used in motorcycle transport tie-down restraints. The improvements herein described provide cam buckle tie-down with higher pre-load capacities. Also included are improvements in the design of associated web hooks for the tie-downs.

2. Background Art

The huge outdoor recreation industry in the United States has resulted in a requirement for transporting motorcycles and other RV vehicles.

Within this backdrop, the inventor hereof has devised several mechanisms that in one way or another assist in lifting and transporting a recreational device like a motorcycle or a personal watercraft as exemplified in the teachings of U.S. Pat. Nos. 4,790,713 and 4,932,829 that were issued to the inventor hereof, and in published U.S. Patent Application Publication No. 2005/0111945 also to the present inventor.

More recently there are described even further improvements in lifting mechanisms such as those disclosed in U.S. patent application Ser. No. 12/321,267 filed Sep. 2, 2008 for a truck bed carrier and U.S. patent application Ser. No. 12/384,630 filed Apr. 8, 2009 dealing with the confined lifting geometries associated with an enclosed carrying vehicle, both of which are incorporated by reference as if fully set out at length herein.

It is well appreciated that any extended transport of RV vehicles will require proper restraint of that cargo during transport.

The principal components in the restraint methods, are the wheel chocks to restrain horizontal movement, and the adjustable tie-down straps or cables used to limit vertical movement of the cargo. These tie-down restraints have two load requirements: Maximum Working Load—this is the strength of mechanical components of the tie-down assembly reduced by a safety factor. Preload—Is the static down force imposed on the transported vehicle by tie-downs. The preload tension desired will depend primarily on the weight of the restrained vehicle and the stiffness of the suspension system of said vehicle. The purpose of "preload" is to obtain sufficient down-force on the suspension to limit vertical movement of a vehicle during transport, but to not apply excess preload force which can damage the vehicle suspension system.

In the past years, simple cam buckle tie-downs have worked well for restraining lighter weight motorcycles. The simple cam buckle tie-downs are limited in the amount of preload force to what one normal person can pull. For that reason the preferred tie-down for heavy motorcycles has been the ratchet type where the higher restraining forces are obtained by winding up a flexible strap onto a ratcheted spool, as exemplified in the teachings of U.S. Pat. No. 7,416,167 issued to Knox, U.S. Pat. No. 6,547,218 issued to Landy, and many others. These ratchet type mechanisms are unwieldy in the cramped spaces of the cargo area of trucks and trailers. The light duty ratchets can only wind up a short amount of web material on the small spools: which results in lengthy adjustment time. Also when the high compression force in the transported vehicle's suspension system is released by the ratchet pawl, there can be a dangerous jump movement in the transported vehicle.

For these reasons, the convenience of a flexible strap with a cam buckle is often preferred over ratcheted types. However, the simple cam buckles are limited in the amount of preload force that can be imposed by one's arm in a cramped space. For that reason a cam buckle that developed additional force due to multiplication by internal pulleys would be a welcome solution to many recreational vehicle tie-down requirements.

The clamping buckles that are particularly adapted for these tie-down applications are cam buckles including a one Piece frame exemplified by buckles sold under model designations 40880-22; 42195-11; or 40880-15 by Ancra International, LLC, Hawthorne, Calif. Cam buckles of this type typically include a generally C-sectioned unitary frame supporting a pivot extending between the lateral walls thereof on which a spring biased lever is pivoted to press a toothed cam against a strap or belt extending through the frame interior. Once grasped against the strap tension, the engagement of the cam is then released only by pressing the lever against its spring bias, thereby lifting the cam from its captured position against the strap.

It has been found that in the foregoing cam buckle structure the lateral walls of the single piece frame can be rendered even more useful to serve as supports for additional pivots about which the strap can be looped in order to obtain the load multiples of additional pulleys. Also by proper location of the primary pulley and the locking cam, the load strap is directed just under the actuating lever of the cam, so that tension in the web will provide a lifting force to the lever to initiate rotational closing of the web clamp. The shape of the clamp cam with directed teeth, then locks the load strap and prevents its release unless direct pressure is applied to actuating lever. This eliminates the need for an actuating spring.

Typical motorcycle tie-downs have heavy steel "S" open hooks at the ends to allow attachment between motorcycle and vehicle carrier. For modern motorcycles, the steel hooks (even with vinyl coatings), are not acceptable to the vehicle owner. For this reason, "soft hooks" are used for direct attachment to the cycle. These soft hooks are stitched nylon web loops that can be cinched to suitable motorcycle structure with a length adequate to keep the heavy hook and the adjacent steel web clamp a safe distance from the motorcycle during transport. The open hooks are trapped onto the restrained vehicle by the web tension. However, certain rough road conditions (dips, heaves, ruts, etc.) and sudden carrier vehicle direction changes can create so much movement on the motorcycle suspension as to allow the standard open hooks to escape from the soft hook web loop. A new web clamp design that incorporated a hook in the design of the web clamp frame was described in the parent application hereof. This integral hook is described as having a closing latch to support the open side of hook, and of course the latch prevents the possibility of the hook escaping the loop of a soft hook.

Since "soft hooks" are a standard means to attach to street motorcycles, there is a need for optimum means to attach to these types of web loops. An alternate design specific for a web hook that will lend itself for use as web clamp end-attachment is also described herein.

The web clamp designs herein resulted in another consideration for motorcycle tiedown equipment. When motorcycles are transported inside trailers or trucks, the web clamps are frequently in a location that is access restricted. In this case, the direction orientation of the web clamp is critical in order to allow the operator to have a straight line pull on the web tensioning end of a tie-down. Also with the inventive force multiplying web clamp design, it is important to avoid misaligned or twisted webs on the tie-down, as the increased friction will limit the ability for the web clamp to develop the desired web tension. It is the accommodation of the new web clamp design that will insure optimum orientation of the web clamp for the operator, and proper alignment of the web with the web clamp. As used herein, the terms "web and "strap" are interchangeable.

SUMMARY OF THE INVENTION

Accordingly, it is a general purpose and object of the present invention is to provide a single piece frame cam buckle assembly for multiple loop load application.

Further objects of the invention are to provide improved end-attachments for the cam-buckle frame to facilitate and improve the means to attach the web tensioning device to the transported vehicle.

As described in the parent application hereof, the single piece frame may be modified to extend as a longitudinal projection of one side-wall that is formed into a partial U-shape and aligned to form a hook opening between its free end and the opposing side-wall. This hook opening is then closable by a latch pivoted from the free end of the hook to the adjacent post. This latch serves to increase the load capacity of the hook, and to secure the tie-down to restrained cargo.

Briefly, these and other objects are accomplished within the present invention by providing a single piece frame of a cam buckle which includes a plurality of transverse pivot rollers bridging across the lateral walls of the frame. The pivot axis and the radial dimensions of the pulley ahead of the web clamp direct the web under the foot-pad of the clamp portion of the web clamp. The pivot axis and dimensions of the web clamp cam with its lever, are selected so that the ball-end of the lever arm is just resting on the surface of the web. As the web is pulled under the web clamp during tensioning by the operator, the cam is rotated so that the lever arm of the cam depresses the center of the span of the passing web. When the operator finishes a tension adjusting pull, the resulting tension on that web span lifts the end of lever which then engages the teeth of the cam. Once engaged to web, the web tension further rotates the cam to secure a lock on the web. The strap induced forces on the cam lever effectively replace the function of the torsion spring. The web clamp can only be released by depressing the operating lever to rotate the clamping cam. A rotatable cam interlock is positioned adjacent the levered cam, and can be manually rotated by one's thumb to provide a lock to prevent any accidental depression of the operating lever of the toothed clamping cam.

Those skilled in the art will appreciate that for the inventive cam-buckle to operate properly, it would require a close fit tolerance between the eccentric locking toothed cam and opposing base of the buckle assembly.

An alternative design for an end-attachment web hook is described herein. This end attachment is a pivoting hook, designed specifically to securely capture the web loop of a soft hook. In one embodiment this attachment is dimensioned to be mated to the closed end of the single piece frame of the web clamp. This end attachment would be attached to the frame with a pivot pin and low friction washer. As an alternate to a fixed end web hook, a pivoting web hook end-attachment will pivot axially to allow the web clamp to be orientated as best suited for the operator. Typically this end attachment would be generally rectangular in shape with a narrow opening path sized to allow the soft hook loop to slip onto the attachment. Due to the narrow width of the slit, the only way that the loop web can be released is to hand guide the web through the slit.

Further, the axially pivoting end attachment can be incorporated into a web hook for capturing a web loop attached to cleats, or other hard points of the transporting vehicle. This will insure that the tensioning web cable is not twisted and is directly in line with the web clamp frame. It will be appreciated that this design is basically a U-channel shape frame where the opposing walls have pivot posts that can serve to install pulleys or serve as the termination post for the load web. The center of the frame is the pivot axis for attachment of a pivoting slotted hook. The pivot points of this frame allow multiple line load paths between the web clamp and this end hook.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which:

FIG. 2A depicts web-routing for a single line pull;

FIGS. 5 and 6 also illustrate a pulley loop arrangement for two-line and three-line force multiplication.

DESCRIPTION OF THE PREFERRED EMBODIMENTS

Figure 1:
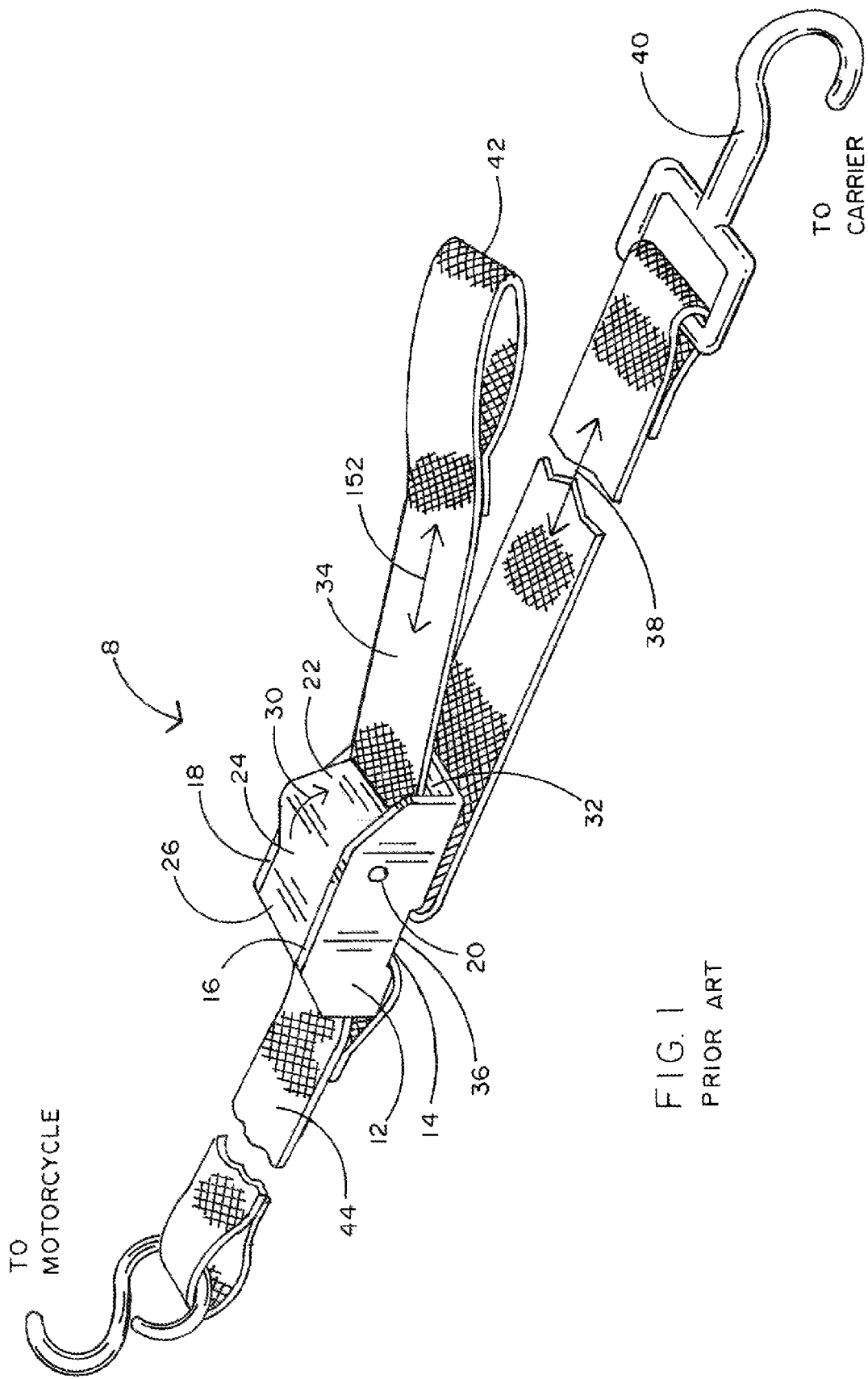
FIG. 1 is a perspective illustration of a prior art cam buckle assembly deployed for use in cargo restraint.

As shown in FIG. 1 a conventional cam buckle assembly 8 comprises a single piece unitary frame 12 of a generally C-shaped section defined by a bottom surface 14 spanning between two lateral walls 16, 18. A transverse pivot pin 20 extends between the walls 16, 18 proximate the one ends thereof to support a cam piece assembly 22 that has a lever actuating arm 24. The end of the lever arm is identified as reference numeral 26.

A helical bias spring on pivot pin 20 is compressed between wall 16 and the lever 26. The spring urges the free end 26 of the cam piece 22 in the direction of arrow 30 towards an anvil piece 32 supported on the bottom surface 14, capturing a load carrying strap 34 therebetween as it is passed through an aperture 36 in the bottom surface 14 against the tension force 38 carried by the strap to an end hook 40. This force corresponds to the manually applied tensioning force at the strap's free end 42. A strap loop 44 around the other portion of the bottom surface 14 bordering the aperture 36 is then useful as the other end of this tension force combination.

While there are many commercial forms of the foregoing cam buckle assembly, those skilled in the art will be familiar with the examples thereof sold under model designations 40880-15 or 40880-22 by the Ancra International, LLC identified above for use in restraining motorcycles and other recreational vehicles in the course of transport. Those skilled in the art will also appreciate that in actual use these tie-downs will be used to impose a certain preload on the suspension system of the restrained vehicle. The standard cam buckles are limited to the amount of force one can generate with one arm in a cramped space. Where somewhat higher preload forces are desired, the ratchet types are used; but they are not well suited for operation in cramped quarters. A simple cam type web tie-down system that will develop higher preload forces and improved operational convenience is provided in the inventive mechanism described below.

Figure 2:
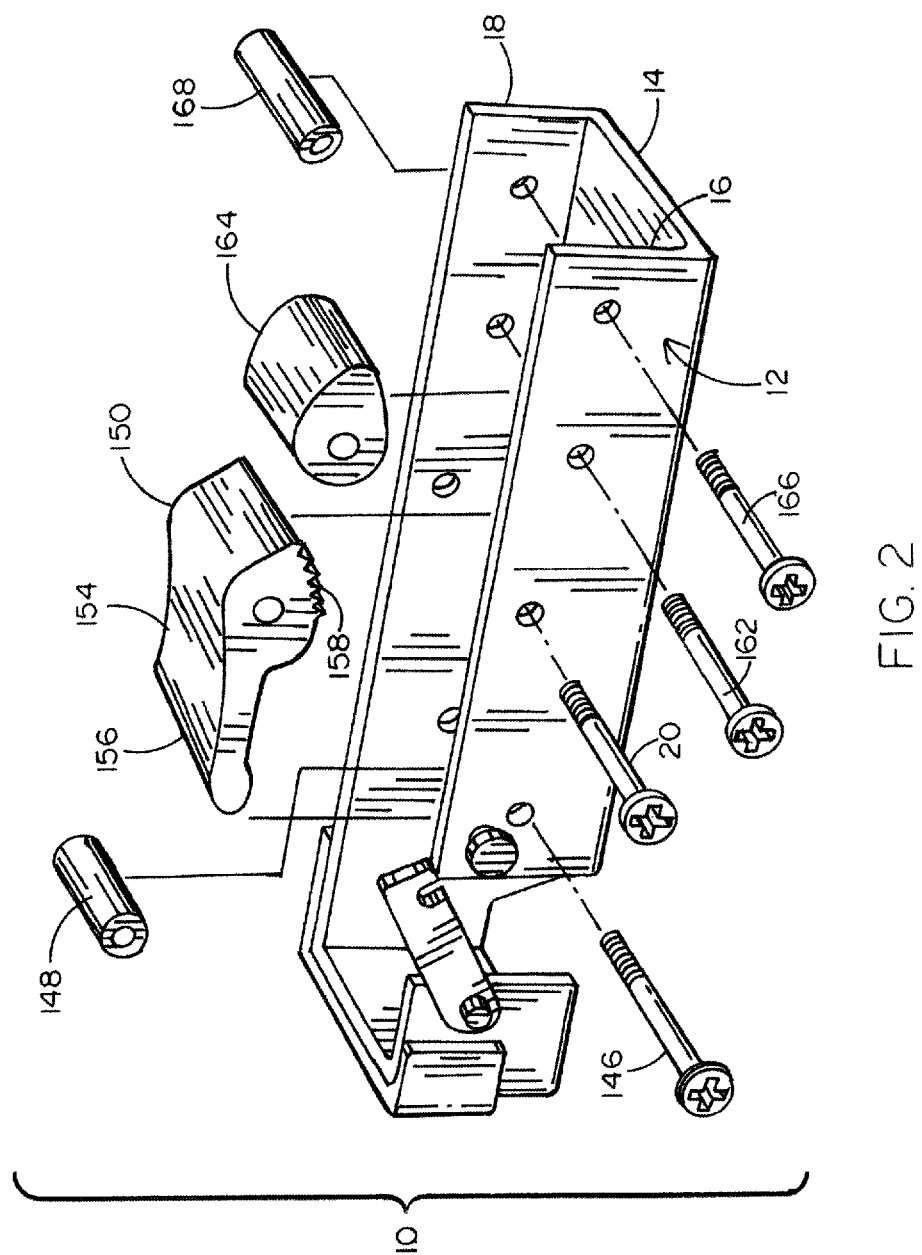
FIGS. 2 and 2A are exploded end perspective illustrations of the inventive cam buckle assembly having an integral hook in the buckle frame and showing the latch that secures the integral web hook.
Figure 2A:
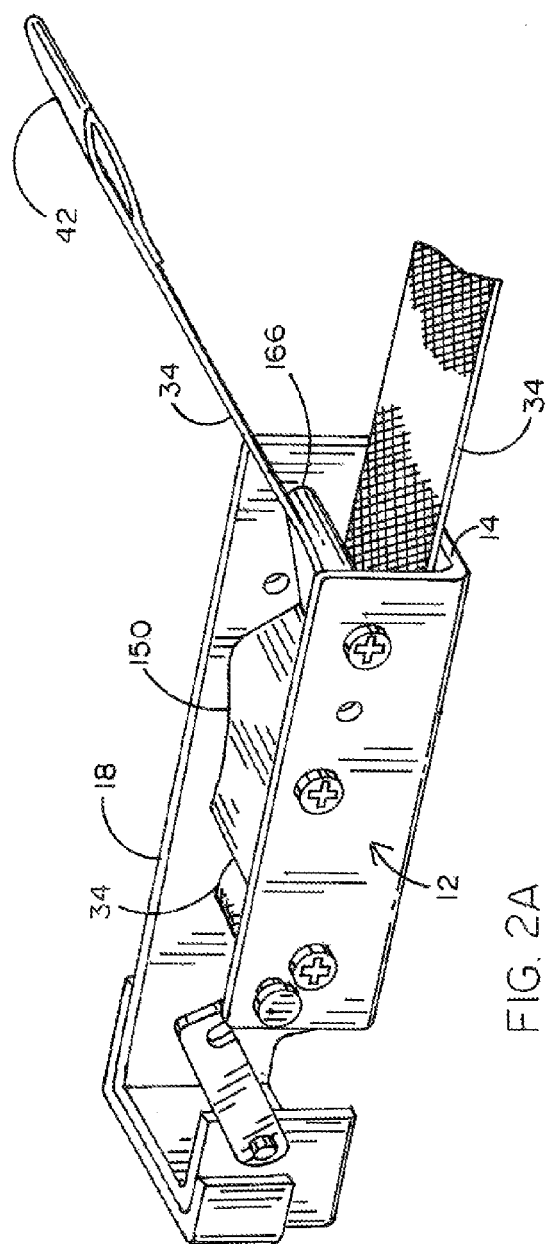

FIGS. 2 and 2A display components of inventive cam buckle assembly 10 with a unitary frame 12 similarly defined by a lower surface 14 bordered by sidewalls 16, 18 to support the bridging pin 146, locking cam post 20, bridging post 162, terminal post 166 and pulley 168.

As pulling tension is applied to the free end 42 of a strap 34, the strap 34 will move along the inside of the frame 12; the primary pulley 148 will turn the strap 34 back to pass under a locking cam 150 of web buckle. In the application of the tie-downs, the manual force is applied at the free end 42 of strap 34 to overcome the opposing load from the compression of the suspension system of the transported vehicle. As the free end 42 of the strap 34 is drawn out to increase the preload force, the strap tension is resolved in part as a friction shear force on the locking cam 150. As the manual force is increased, the turning moment imposed on cam 150 also increases to a point where the lever arm 154 of the cam-lock 150 is depressed downward deflecting the strap 34 spanning the distance between the primary pulley 148 and the cam 150. When the manual force on the free end 42 is stopped, the frictional turning moment on the cam 150 is ended and the tension in the strap span lifts the end 154 of the locking cam 150. As the cam 150 rotates, the teeth 158 of the cam 150 engage the strap 34 and the locking cam 150 is locked tight by the strap tension. The locked cam buckle 10 can only be released by manually pressing the cam lever 154.

As can be seen, this inventive design of the web clamp, eliminates the requirement for the torsion spring to initiate the closing of the web clamp.

In the inventive buckle 10, a bridging post 162 is mounted across frame 12 to provide a post for an interlock cam 164 adjacent to the cam 150. After the cam 150 engages and locks onto the strap, the cam 150 is drawn tight by the strap tension. The locking cam 164 can then be rotated by one's thumb to tighten down on the nose of the cam 150, and thereby lock the cam 150. The actuating lever 154 cannot be depressed until the locking cam 164 is rotated back to disengage from the locking cam 150. This interlocking cam 164 would prevent any accidental release of web clamp 10.

Figure 2B:
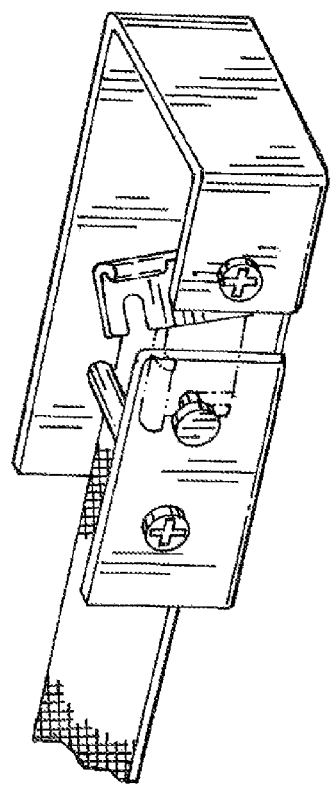
FIG. 2B shows the same basic frame design illustrated in FIGS. 2 and 2A but without a locking cam. This design can serve as a hook end of the web strap. This design includes the integrated hook and latch, and the post positions for a pulley for force multiplication load paths.

As noted in FIGS. 3-6 this frame is differentiated from FIG. 2, 2A, 2B by the closure wall between the frame sidewalls. This frame assembly designated 210 has the closure wall 15, said wall having a central pivot post to allow attachment of pivoting web hooks. Buckle assemblies 10 and 210 have the same internal operating components.

It will be appreciated that the foregoing arrangement provides the added security by the increased load capacity of the multi-load path web, and the extra security of the described web hooks. As a result, an inexpensive and rugged mechanism is provided that is widely useful in various applications.

The integral hook design depicted in FIGS. 2, 2A-B would be suitable for many tie-down applications. However for those applications requiring use of soft hooks, and/or applications in cramped quarters, the pivoting web hooks depicted in FIGS. 3-6 would be recommended. Soft hooks are now a standard means of attaching web tie-downs to modern street motorcycles.

Figure 3:
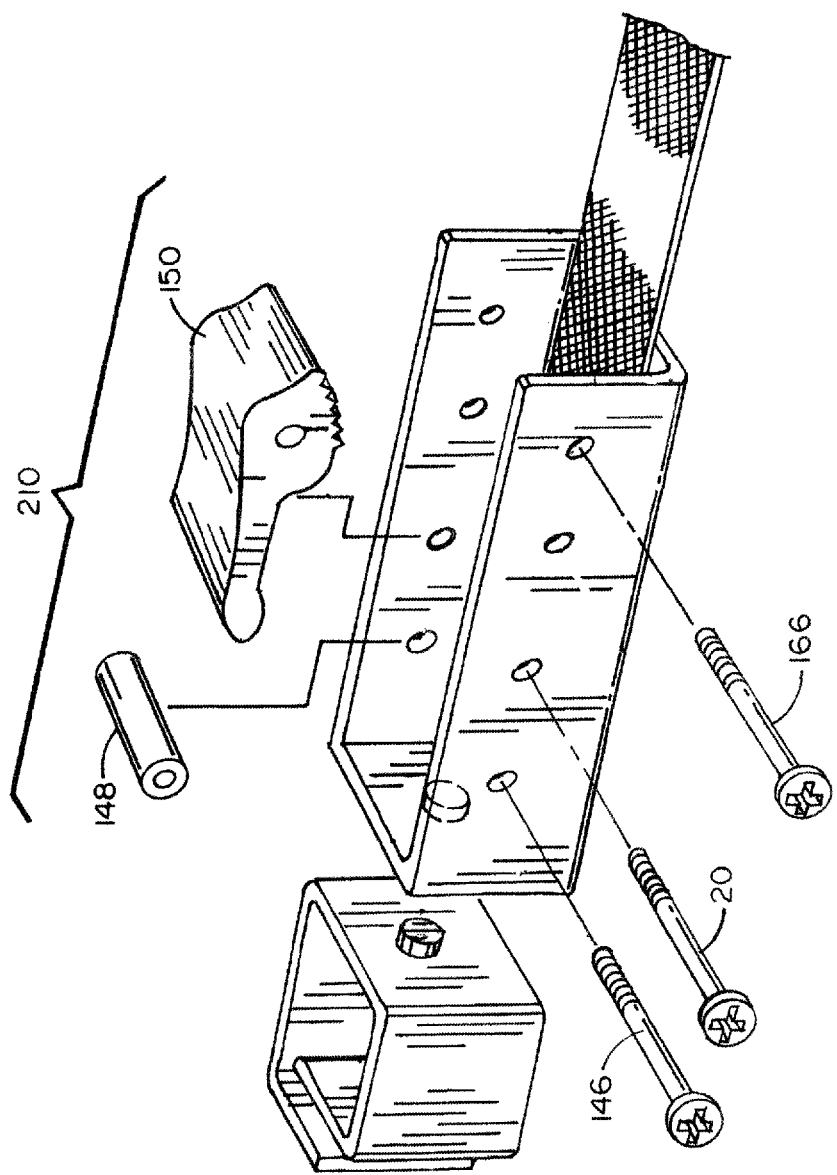
FIG. 3 is a perspective illustration of an alternate frame design of the inventive cam buckle having a structural wall closing one end of frame. In this illustration the roller and locking cam are shown removed for clarity. The optional interlock for the locking cam is not displayed. The closure wall has a central pivot-post useful for attachment of integral pivoting hook ends. One such talon-shaped hook-end is displayed.
Figure 4:
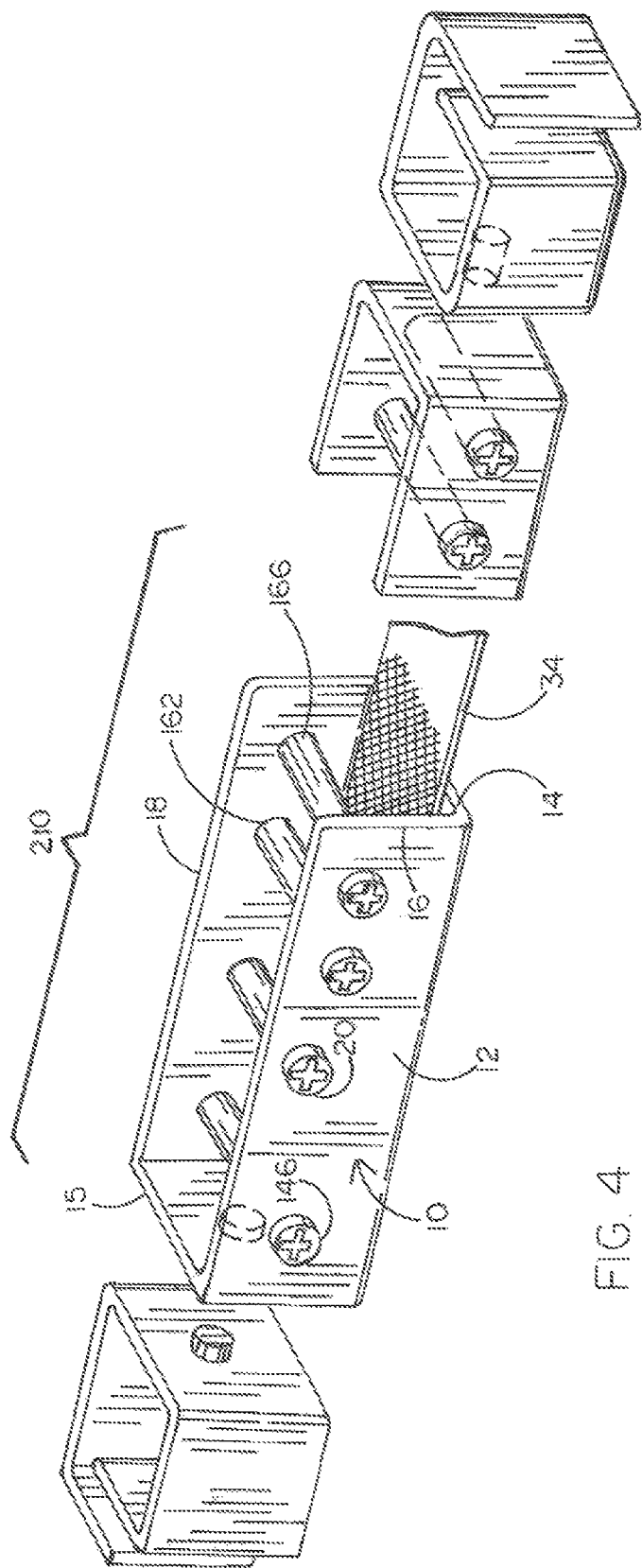
FIG. 4 is a perspective illustration of the inventive cam buckle assembly depicting the pivoting web hook for buckle frame and a remote pulley hook assembly. Rollers and cams for posts are not displayed.
Figure 5:
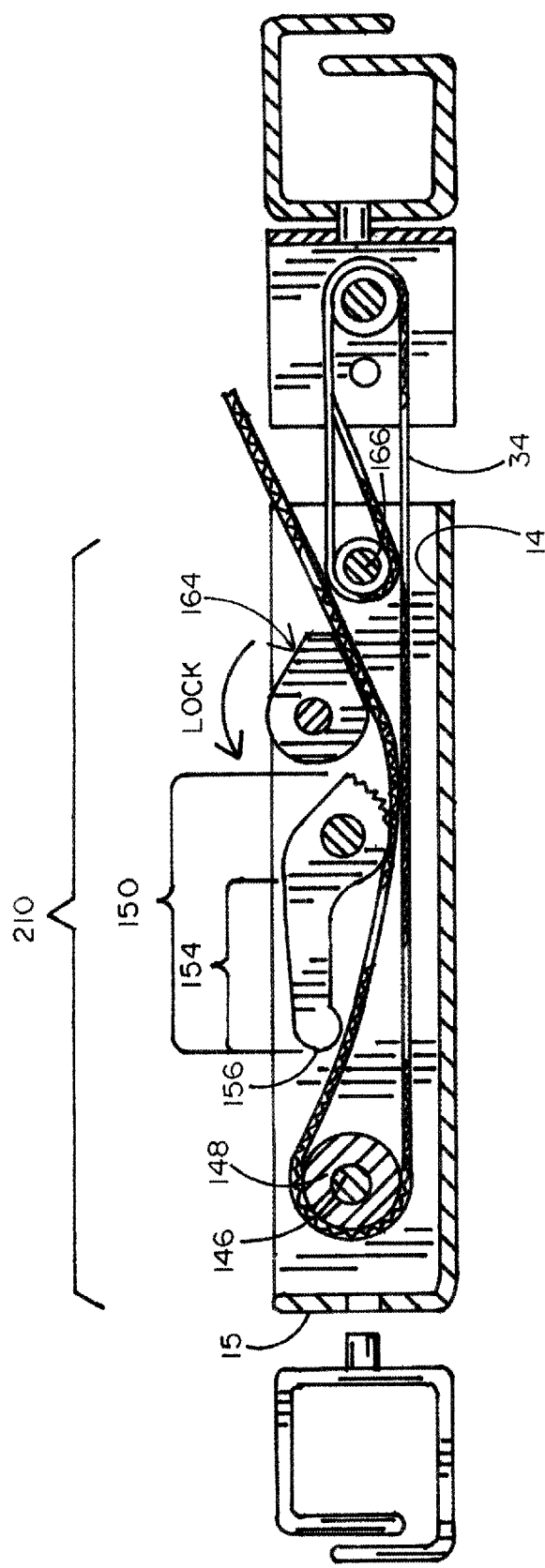
FIGS. 5 and 6 are respective diagrammatic sectional views of the inventive cam buckle with pivoting web hook. The hook at the cam-buckle would be used to secure a web loop cinched to the transported vehicle. The pivoting hook assembly at end of the tie-down would be used to secure a web-loop from the cargo attach point in the transporting truck or trailer.
Figure 6:
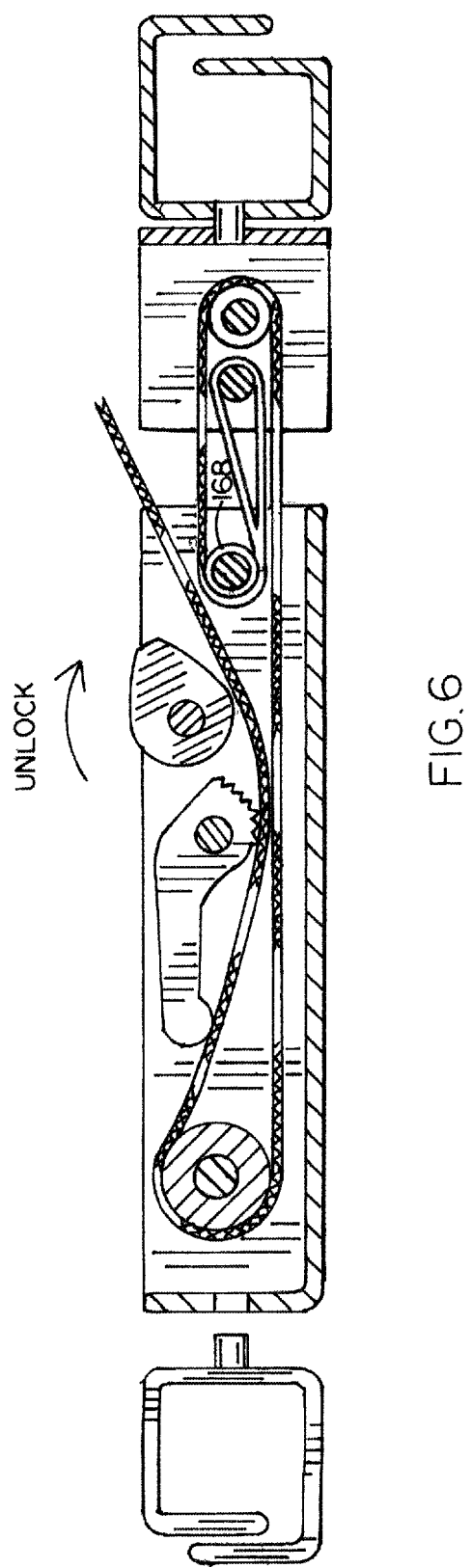

FIGS. 3 and 4 show a hook design specifically for use with soft hooks that can be incorporated onto a force multiplying web clamp and used in the associated opposite hook end of web tie-down. This hook design can be part of the pivoting hook assembly to allow multiple load line for a force multiplication of the preload force capability of the tie-down. One such design would be a hook of rectangular cross section with one side open with a narrow gap or slit. The base of this hook opposite the gap would have a center pivot post. That narrow slit hook would attach to either the closed end of frame of the web buckle, or could be attached to a U-shaped frame that would support a post for pulley or web line termination. The dimensions of this hook would be specific in length, width, and gap opening to accept the specified soft hook loop. The soft hook would be cinched to the transported vehicle and also used to attach to cargo rings or cleats in the transporting truck or trailer.

The preferred web cam buckle assembly 210 has the end of frame proximate the first turning roller closed out by a vertical wall connection between the opposing walls. This close out wall contains a center hole as a pivot mount for alternate end web hook designs.

The end attachment web hook apparatus is basically rectangular in shape, with one wall having a centerline gap sized to allow a sideways insertion of a portion of a closed strap web loop of specific width and thickness. Opposite the web gap is a centerline port to support a pivot post to attach this hook to the frame 12 of the web buckle 210.

The end attachment web hook apparatus is attached to a center port of a U-shaped pulley frame 12 to serve as a pivoting multiple line web hook assembly.

Obviously many modifications and variations of the instant invention can be effected without departing from the spirit of the teaching herein. It is therefore intended that the scope of the invention be determined solely by the claims appended hereto.

I claim:

1. A cam buckle assembly comprising:
   a frame having an elongated bottom surface, a pair of side surfaces along opposed edges of the elongated bottom surface;

a locking cam that is pivotally mounted to the frame, said locking cam has a cantilevered operating lever section and a friction section, the lever section defining an end portion;

a primary pulley mounted for rotation in said frame proximate the end portion of said cantilevered operating lever section; and a web cable strap with a first portion spanning from a free end of the strap to the friction section of the locking cam, a second portion of the strap defined by an area under the friction section of the locking cam, a third portion of the strap spans from the friction area of the locking cam to the primary pulley, the locking cam is positioned to allow the end portion of the lever section of the locking cam to ride on and depress and deflect the third portion of the strap, an opposing force from the deflected span of the third portion will serve to pivotably articulate the locking cam to initiate locking action, a fourth portion of the strap routes around the primary pulley, a fifth portion of the strap proceeding from a bottom of the primary pulley along the bottom surface of the frame directly under the third and the second portion of the strap to a point below the pivot axis of the locking cam, a sixth portion of the strap extends from the fifth portion of the strap along the bottom surface of the frame to an attachment point;

wherein as the free end of the strap is drawn out under tension, the second portion of the strap passing under the friction section of the locking cam will result in a rotational moment that will pivot the locking cam resulting in the end portion of the lever section deflecting the span of the third portion of the strap, the opposing force from the deflected span will apply a lifting force on the end portion of the cantilevered operating lever section of the locking cam, so when the strap tensioning movement stops, the rotational moment on the locking cam stops, and the strap tension in the third portion lifts the lever section of the locking cam resulting in the friction section of the locking cam engaging the second portion of the strap and the tension in the third portion of the strap pivots the locking cam to a fully locked position.

2. The assembly according to claim 1 where the tension in the third portion of the strap initiates a closing movement of the lever section of the locking cam when the drawing out of the free end of the strap is stopped.

3. The assembly according to claim 2 where the closing movement of the operating lever section results in engaging the friction section of the locking cam to the strap, where a combination of the second portion of the strap and the fifth portion of the strap are trapped by the locking cam as it rotates to the fully locked position.

4. The assembly according to claim 1, further comprising a post for a second turning roller at an opposite end of the frame mounted for rotation in said frame.

5. The assembly according to claim 1, further comprising an interlock cam adjacent to the locking cam and that can be rotated to provide a positive lock to prevent release of the locking cam.

6. The assembly according to claim 1, wherein one end of one of the side surfaces of said frame proximate said primary pulley roller forms a hook.

7. The assembly according to claim 6 further comprising a latch on said hook for selectively closing said hook.

8. The assembly according to claim 1 having the end of said frame proximate the primary pulley closed out by a vertical wall connection between the side surfaces and having a center hole as a pivot mount.

9. The assembly recited in claim 8 further comprising cm end attachment web hook apparatus that is rectangular in shape, with a forward wall having an opening path sized to allow a sideways insertion of a portion of a closed strap web loop of specific width and thickness, said web hook apparatus having a centerline port to support a pivot post to attach to said center hole pivot mount of the frame.

10. The assembly recited in claim 8 further comprising an end attachment web hook apparatus attached to said center hole of said frame to serve as a pivoting multiple line web hook assembly.

11. The assembly of claim 1 wherein the friction section has a teeth configuration.

* * * * *